No. 607,383. Patented July 12, 1898.
P. E. LOREE.
COMBINED RAKE AND ROLLER CUTTER.
(Application filed Feb. 21, 1898.)
(No Model.)

Witnesses.
George Hudman
J. F. Gates Edwards.

Inventor.
Perry E. Loree
by Alfred M. Allen
Attorney.

THE NORRIS PETERS CO., PHOTO-LITHO., WASHINGTON, D. C.

UNITED STATES PATENT OFFICE.

PERRY E. LOREE, OF DAYTON, OHIO, ASSIGNOR OF ONE-HALF TO JOHN C. ELY, OF SAME PLACE.

COMBINED RAKE AND ROLLER CUTTER.

SPECIFICATION forming part of Letters Patent No. 607,383, dated July 12, 1898.

Application filed February 21, 1898. Serial No. 671,075. (No model.)

*To all whom it may concern:*

Be it known that I, PERRY E. LOREE, a citizen of the United States, residing at Dayton, in the county of Montgomery and State of Ohio, have invented a certain new and useful Combined Rake and Roller Cutter intended for general garden purposes, but more particularly for pulverizing clods and lumps of earth and the preparation of ground for seeding, of which the following is a full, clear, and exact description, reference being had to the accompanying drawings, forming part of this specification.

In preparing garden-plots for seeding purposes it is frequently desired to pulverize the soil as fine as possible, which cannot be done by the ordinary garden-rake, and it is the intention of my invention to supply, in connection with the rake, a series of disk cutters to be used alternately with the rake in the preparation of the soil, or, when desired, both may be used simultaneously.

Figure 1:
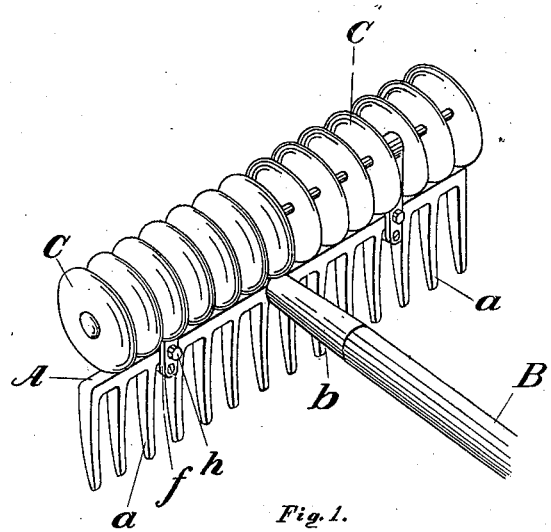
Figure 3:
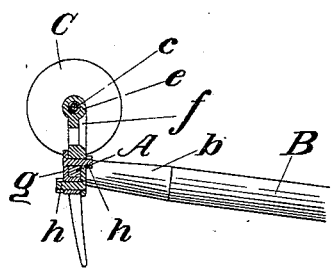
Figure 2:
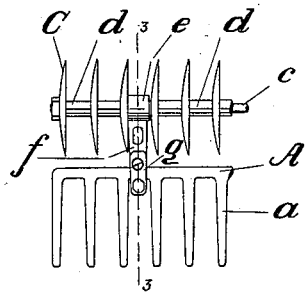

In the drawings, Figure 1 is a perspective view of the implement. Fig. 2 is a front view of a portion of the implement, showing the method of attachment of the disk cutters to the rake-bar. Fig. 3 is a cross-section on the lines 3 3 of Fig. 2.

A is the rake-head, $a$ the rake-teeth, $b$ the shank, and B the handle, of an ordinary rake.

$c$ is a rod or shaft upon which are mounted a series of disks C. These disks may be flat, but they are preferably concavo-convex, each half of the series being arranged with their concave sides toward the center. The disks are separated from each other by the spools $d\ d$.

$e\ e$ are collars within which the disk-rod $c$ is journaled so as to rotate, the collars being provided with the arms $f$, by means of which they are clamped by the plates $g\ g$ and bolts $h\ h$ to the rake-head A, the supporting-arms and clamp-plates being each provided with shoulders to fit around the rake-head.

When it is desired to use the implement either as a rake or cutter separately, I secure the cutter-shaft vertically to the rake, as shown in the drawings; but when it is desired to employ the rake and clod-cutting device simultaneously, by loosening the clamping-bolts the cutter-shaft may be secured parallel to the rake-head in such a position that the disks will rotate on the ground as the rake is used.

In the implement as I have shown it the cutting-disks are substantially in the same planes with the rake-teeth; but when the rake-teeth and cutting-disks are intended to be used simultaneously the disks should be preferably so adjusted that the cutting-paths of the disks will be between those of the rake-teeth.

Having thus described my invention, what I claim, and desire to secure by Letters Patent, is—

1. In a combined rake and cutter, the combination, with the rake head and teeth, of a series of revolving cutting-disks secured to the rake-head, substantially as shown and described.

2. In a combined rake and cutter, the combination, with the rake head and teeth, of a shaft secured to the rake-head and parallel thereto, said shaft carrying a series of revolving cutting-disks, substantially as shown and described.

3. In a combined rake and cutter, the combination, with the rake head and teeth, of a shaft parallel to the rake-head, carrying a series of revolving cutting-disks and means for adjustably securing said cutting-disks to the rake-head, whereby said disks may be brought into operation simultaneously with the rake, substantially as shown and described.

PERRY E. LOREE.

Witnesses:
 GUY C. WEEKS,
 ORLA E. HARRISON.